INVENTOR.
Elkin H. Thompson

United States Patent Office 3,177,947
Patented Apr. 13, 1965

3,177,947
METHOD FOR EXTINGUISHING FIRES WITHIN COTTON BALES
Elkin H. Thompson, 1108 W. Hale Ave., Osceola, Ark.
Filed Apr. 8, 1963, Ser. No. 271,279
4 Claims. (Cl. 169—1)

This application relates to a method and apparatus for extinguishing fires within cotton bales. Such fires are commonly the result of sparks set off by contact between the metal parts of cotton ginning machinery and small rocks or pebbles which may be fed into the machinery with the raw cotton. The fires originate at points not readily subject to inspection and the smoldering cotton is then automatically bound into bales. Frequently, the particular bit of cotton which has been ignited is buried deep within the bale, and makes its presence known only by wisps of smoke emerging therefrom, and this smoke may not begin to appear until some time after the cotton has been baled. Present methods of dealing with such bales usually result in the loss of or substantial damage to much of the cotton in the bale. The average gin loses from 4 to 12 bales a year in this way, and each bale is worth from $150.00 to $175.00. The bales also present a substantial fire hazard to the gin itself, and several burn down every year as a consequence of fires originating in the cotton bales.

In order to avoid loss of the cotton in the burning bales it is necessary to device an extinguishing method which is (1) quick acting so as to prevent any large quantity of the cotton in the bale from becoming charred and (2) will not in itself damage the cotton.

Previous attempts to solve this problem have included the provision of water spraying apparatus, and the provision of a fire-proof hermetically sealed chamber into which the bale is introduced and from which air is evacuated and replaced by a non-combustible gas.

These methods are unfortunately too slow, since the water will not penetrate the densely packed bales, and while the non-combustible gases replace the oxygen surrounding the bale, sufficient oxygen is trapped within the bale to support combustion for a considerable period of time.

I have therefore invented a three-way approach to the problem, according to which the bale is placed in a sealed fire-proof chamber and the fire attacked in three ways:

(1) Suction is applied at the top of the chamber to draw out the air and $CO^2$ is introduced at the bottom, so that the bale becomes immersed in the non-combustible $CO^2$.

(2) The $CO^2$ is supplied in liquid form and permitted to expand within the chamber, thus cooling the bale at the same time the oxygen surrounding it is replaced.

(3) A mist of water is sprayed into the chamber, said water being mixed with wetting and penetrating agents which assist it in penetrating into the bale until it reaches the fire itself.

The combination of these three procedures has proven most effective.

A preferred embodiment of my invention will now be described, with reference to the accompanying drawings, in which:

FIGURE 3 is a side elevation, taken from the left of FIG. 2.

Like reference numerals denote like parts throughout the several views.

Figure 1:
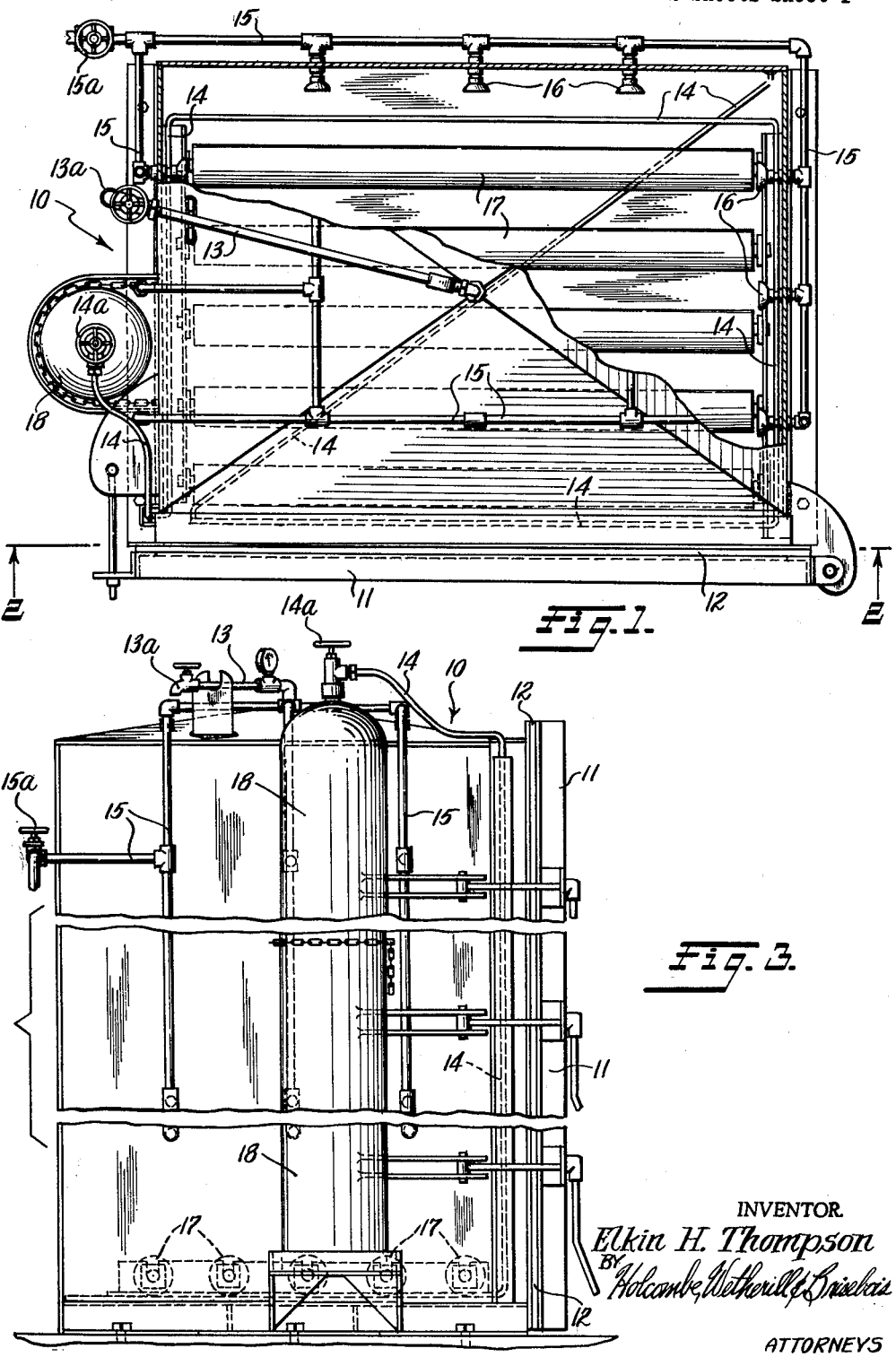
FIGURE 1 is a top plan view of a chamber embodying my invention.
Figure 2:
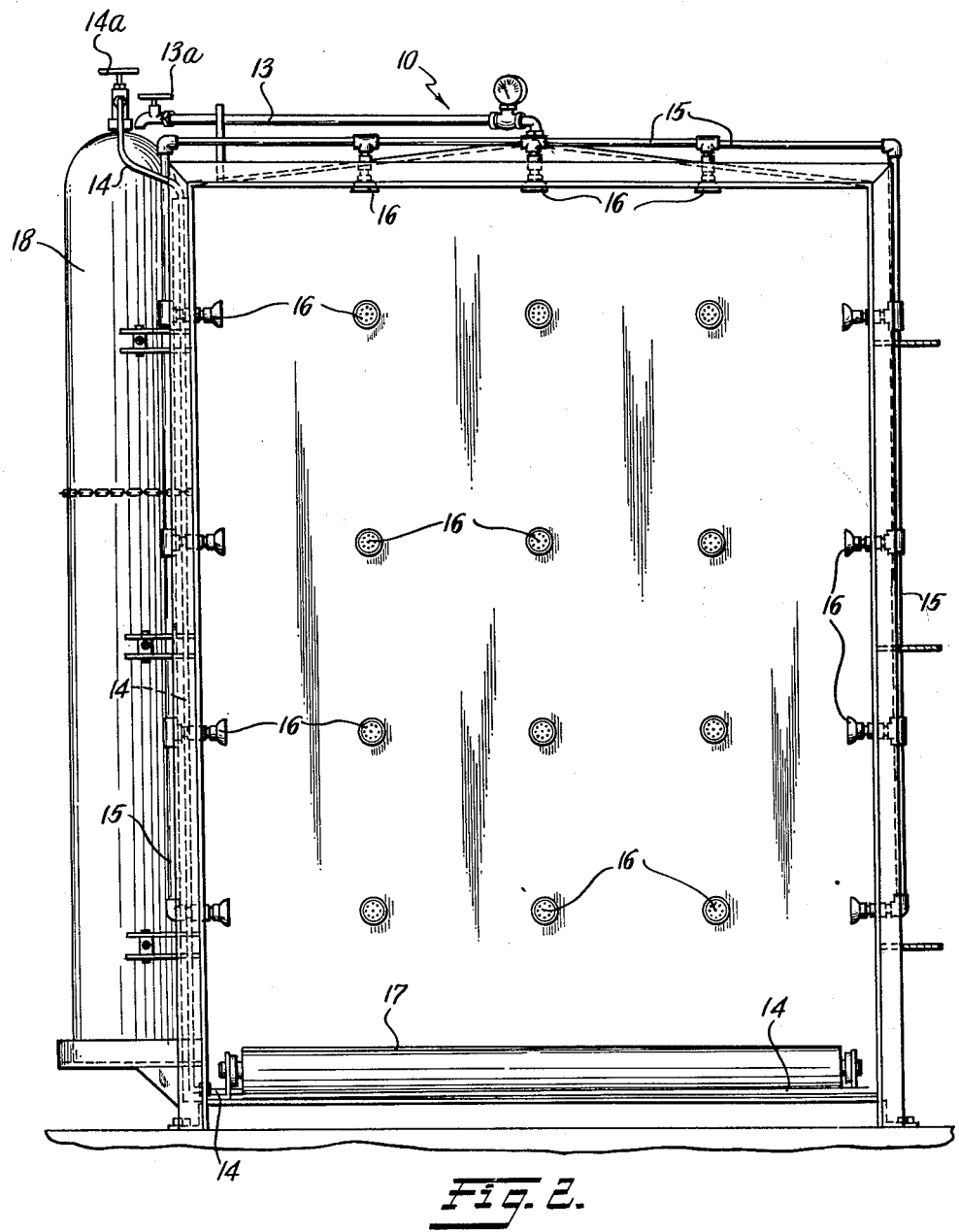
FIGURE 2 is a central vertical section, viewed from the front of the chamber.

Referring now to FIGURE 2, it will be seen that a chamber 10 is provided with a door 11 for admission of a burning bale. When closed, the edges of the door 11 cooperate with sealing means 12 to hermetically seal the chamber. Three pipes 13, 14 and 15 lead into the chamber. The first of these, 13, may be connected to suction means (not shown), or simply to the ambient air and is used to evacuate air from the chamber. The second pipe 14, is connected to a container 18 filled with liquid carbon dioxide which is under pressure. The third pipe 15 is connected to a container filled with a mixture of water, ethylene glycol and Triton X-100 (a wetting and penetrating agent sold by Rohm & Haas). A satisfactory ratio for these substances is 56 pounds of water, to 44 pounds of ethylene glycol, to one pound of Triton X-100. It will be appreciated, however, that this ratio need not be exactly observed. More Triton X-100 may be used, but is not employed since it is the expensive ingredient, and approximately 1 pound per hundred pounds of the other ingredients has proven sufficient to be effective. The amount of ethylene glycol must be sufficient to prevent the water from freezing, and the amount required will depend to some extent upon the temperature to which the $CO^2$ is permitted to reduce the interior of the chamber. The ethylene glycol also serves as a wetting agent.

Other non-flammable antifreeze preparations such as propylene glycol may be used instead of the ethylene glycol, and the Triton X-100 may be replaced by other non-flammable wetting and penetrating agents such as Triton X-45 and Triton X-114. However the particular combination which has just been described is the most effective of which I am aware.

The Triton X compounds referred to above are alkylphenyl(polyethoxy)ethanols having the following specific formulae:

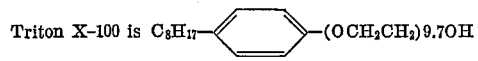

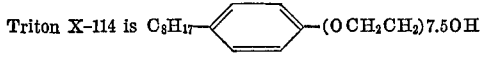

The $CO^2$ is particularly suitable because it is heavier than air.

The pipes are supplied with appropriate control valves, 13A, 14A and 15A, respectively, and when smoke is observed to be coming from a bale it is thrust into the chamber 10 by rolling it on rollers 17. The door 11 is then closed, the valve 13A in the pipe leading to the suction means is opened to draw out air, the valve 14A in the pipe leading to the $CO^2$ supply is opened to admit $CO^2$ at a temperature preferably below 32° F., and the valve 15A is operated to admit the mixture of water, ethylene glycol and Triton X-100, through the pipe 15 and spray heads 16. This mixture may be kept under pressure or pumped in. Alternatively, the supply of this mixture may be connected to the pipe 14 which carries the $CO^2$, in which case it will be drawn in with the $CO^2$ as it enters the chamber. This arrangement avoids the necessity for supplying separate pressure to inject the mixture of water, ethylene glycol and wetting agent. Excellent penetration and prompt extinction of the fire result in either case.

It will be appreciated that the specific structural details illustrated and described have been set forth purely by way of example and may be altered or replaced by their mechanical equivalents without thereby departing from the spirit of the invention as defined by the following claims.

What is claimed is:
1. The method of extinguishing a fire in a dense mass of combustible material which comprises the steps of inserting said mass in a container, closing said container, withdrawing air from said container, introducing into said container a pressurized non-combustible gas at a temperature substantially below the ambient temperature, and spraying into said chamber a mixture of water, a substance which lowers the freezing point of the mixture below the temperature to which said gas lowers the chamber, and a penetrating agent.

2. The method claimed in claim 1 according to which said mixture comprises water, ethylene glycol, and alkylphenyl(polyethoxy)ethanol.

3. The method claimed in claim 1 according to which said mixture comprises about 56 parts of water, 44 parts of ethylene glycol and one part of alkylphenyl(polyethoxy)ethanol by weight.

4. The method claimed in claim 1 according to which the air is withdrawn from the top of the container and the non-combustible gas is introduced at the bottom of said container, said non-combustible gas being heavier than air.

References Cited by the Examiner
UNITED STATES PATENTS

| | | | |
|---|---|---|---|
| 477,875 | 6/92 | Vickers | 169—2 |
| 1,599,826 | 9/26 | Lienhard et al. | 169—2 |
| 2,596,399 | 5/62 | Hammett | 169—2 |

OTHER REFERENCES

Triton, Surface-Active Agents, copyright 1951, Rohm & Haas Company, Philadelphia 5, Pa.

LOUIS J. DEMBO, *Primary Examiner.*

EUGENE F. BLANCHARD, *Examiner.*